United States Patent
Diaz Gonzalez et al.

(10) Patent No.: US 10,189,386 B2
(45) Date of Patent: Jan. 29, 2019

(54) SEAT BELT COVER

(71) Applicant: Honda Motor Co., Ltd., Tokyo (JP)

(72) Inventors: Jesus A. Diaz Gonzalez, Dublin, OH (US); Spyridon G. Blatseas, Dublin, OH (US); Tetsuya Ishikawa, Dublin, OH (US); Jeffrey H. Scheurer, II, Columbus, OH (US); Peter A. Supernavage, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/409,764

(22) Filed: Jan. 19, 2017

(65) Prior Publication Data
US 2018/0201170 A1   Jul. 19, 2018

(51) Int. Cl.
*B60N 2/68* (2006.01)
*B60R 22/36* (2006.01)
*B60N 2/64* (2006.01)

(52) U.S. Cl.
CPC .............. *B60N 2/688* (2013.01); *B60N 2/64* (2013.01); *B60R 22/36* (2013.01)

(58) Field of Classification Search
CPC ................................ B60N 2/688; B60R 22/36
See application file for complete search history.

(56) References Cited

U.S. PATENT DOCUMENTS

| | | |
|---|---|---|
| 5,088,794 A | 2/1992 | Iwami et al. |
| 5,658,051 A * | 8/1997 | Vega ........................ B60R 22/26 |
| | | 280/808 |
| 5,681,081 A * | 10/1997 | Lindner ............... B60N 2/3011 |
| | | 280/808 |
| 5,782,537 A | 7/1998 | Leistra et al. |
| 5,829,831 A | 11/1998 | Sharman |
| 5,964,505 A | 10/1999 | Koenig et al. |
| 5,984,419 A | 11/1999 | Partington et al. |
| 6,065,810 A | 5/2000 | Koenig et al. |
| 6,419,178 B1 | 7/2002 | Kohlndorfer et al. |
| 6,585,325 B1 | 7/2003 | Pal |
| 6,722,601 B2 | 4/2004 | Kohlndorfer et al. |
| 7,510,245 B2 | 3/2009 | Okazaki et al. |
| 7,635,167 B2 | 12/2009 | Okazaki |
| 2004/0021027 A1 | 2/2004 | Kohlndorfer et al. |

(Continued)

FOREIGN PATENT DOCUMENTS

| | | |
|---|---|---|
| JP | 5-112205 A | 5/1993 |
| JP | H10-226311 A | 8/1998 |

(Continued)

*Primary Examiner* — Timothy J Brindley
(74) *Attorney, Agent, or Firm* — Honda Patents & Technologies North America, LLC; Mark E. Duell (57) ABSTRACT

A seat for a motor vehicle includes a seat base, a seat back extending upwardly from a rear portion of the seat base, a seat belt, a portion of the seat belt stored in the seat back, an emergency locking retractor in an outboard side of the seat back, the seat belt being threaded through the emergency locking retractor, and a cover covering the emergency locking retractor and the portion of the seat belt stored in the seat back. The cover may include a first cover piece covering a first side of the emergency locking retractor and the portion of the seat belt stored in the seat back and a second cover piece covering a second side of the emergency locking retractor and the portion of the seat belt stored in the seat back.

15 Claims, 9 Drawing Sheets

(56) References Cited

U.S. PATENT DOCUMENTS

| | | |
|---|---|---|
| 2005/0205709 A1 | 9/2005 | Kohlndorfer et al. |
| 2013/0270380 A1 | 10/2013 | Ellison et al. |
| 2014/0300165 A1 | 10/2014 | Matsumoto et al. |
| 2014/0312677 A1* | 10/2014 | Bostrom ............... B60N 2/688 297/464 |
| 2016/0347225 A1* | 12/2016 | Hayashi ............... B60N 2/688 |

FOREIGN PATENT DOCUMENTS

| | | |
|---|---|---|
| JP | H11-152012 A | 6/1999 |
| JP | 3823416 B2 | 9/2006 |
| JP | 4041916 B2 | 2/2008 |

* cited by examiner

SECTION A-A

SECTION B-B
FIG. 7

SECTION C-C
FIG. 8

SECTION D-D
FIG. 9

SECTION E-E
FIG. 10

FIG. 11

SECTION F-F
FIG. 12

VIEW Z
FIG. 13

SEAT BELT COVER

TECHNICAL FIELD

The embodiments disclosed herein are directed to features for protecting components in a seat of a motor vehicle.

BACKGROUND

In modern motor vehicles, it has become common to make rear seats movable or removable within the interior of the motor vehicle to provide flexibility in seating arrangements or to provide additional cargo hauling capabilities. In order to facilitate making seats movable or removable, the seat belt and the emergency locking retractor (ELR) are mounted to the seat itself rather than to a traditional spot on the C-pillar behind the second row of seats in the motor vehicle. In order to facilitate this mounting location, there is a need to protect the seat belt and the ELR.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a seat for a motor vehicle includes a seat base, a seat back extending upwardly from a rear portion of the seat base, a seat belt, a portion of the seat belt stored in the seat back, an emergency locking retractor in an outboard side of the seat back, the seat belt being threaded through the emergency locking retractor, and a cover covering the emergency locking retractor and the portion of the seat belt stored in the seat back.

According to another aspect, a cover for a seat in a motor vehicle is disclosed. The seat has a seat base, a seat back extending upwardly from a rear portion of the seat base, a seat belt, a portion of the seat belt stored in the seat back, and an emergency locking retractor in an outboard side of the seat back, the seat belt being threaded through the emergency locking retractor. The cover includes a first cover piece covering a first side of the emergency locking retractor and the portion of the seat belt stored in the seat back, and a second cover piece covering a second side of the emergency locking retractor and the portion of the seat belt stored in the seat back.

According to yet another aspect, an integrated seat belt system for a seat in a motor vehicle includes a seat belt, a portion of the seat belt stored in a seat back of the seat, an emergency locking retractor in an outboard side of the seat back, the seat belt being threaded through the emergency locking retractor, and a cover covering the emergency locking retractor and the portion of the seat belt stored in the seat back.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
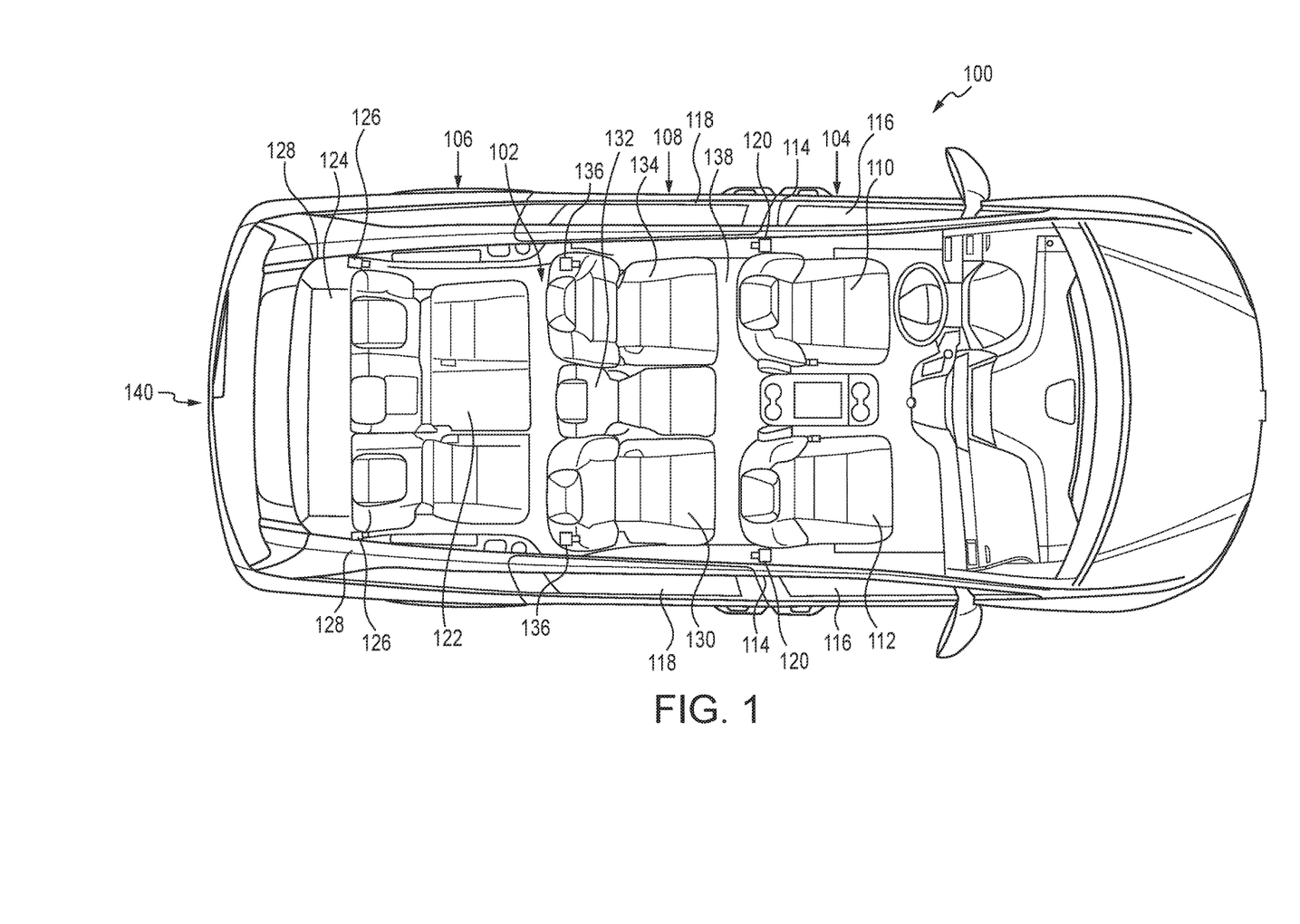
FIG. 1 is a top view of the interior of a motor vehicle.

FIG. 1 illustrates a top view of the interior 102 of a motor vehicle 100. As illustrated, the motor vehicle 100 includes three rows 104, 106, 108 of seats. A front row 104 includes a driver seat 110 and a front passenger seat 112. The driver seat 110 and front passenger seat 112 may be fixed position seats, with each including a seat belt 120 mounted on the B-pillar 114. The B-pillar is located between a front door 116 and a rear door 118 of the motor vehicle 100. An emergency locking retractor (ELR)(not shown) for securing the seat belt 120 in a collision event is typically mounted within the B-pillar 114, where it is protected from damage and debris.

Located toward the rear 140 of the motor vehicle 100 may be located a third row 106 including at least one passenger seat 122. The third row 106 passenger seat 122 is typically not removable, but rather may be folded down and stowed in a rear trunk well 124 when cargo space is required in the motor vehicle 100. The seats belts 126 for the third row 106 passenger seat 122 are typically mounted on a rear pillar 128 of the motor vehicle 100, with the ELRs (not shown) for each seat belt 126 mounted within the rear pillar 128.

Located longitudinally between the front row 104 and the third row 106 is a second row 108 of passenger seats 130, 132, 134. The second row 108 may include two large seats 130, 134, and the smaller center seat 132. In the embodiment shown in FIG. 1, each of the seats 130, 132, 134 is removable from the motor vehicle 100. Additionally, each of the two large seats 130, 134 may be moved laterally in the motor vehicle 100 if the smaller center seat 132 is removed from the motor vehicle 100. The smaller center seat 132 may include a seat belt mounted in the roof (not shown) of the motor vehicle 100, which remains unattached and stored in the roof lining when the center seat 132 is not in use.

With regards to the two large seats 130, 134, in order to accommodate the lateral movement of the seats, the seat belts 136 may be integrated within the large seats 130, 134 themselves. FIGS. 2-14, illustrate an embodiment of the right side seat 130 with an integrated seat belt 136. It should be understood that the arrangement of the left side seat 134 is identical with the exception that the left side seat 134 is a mirror image of the right side seat 130 in order to facilitate the seat belt 136 being integrated on the outboard side of the seat. The embodiment described herein will be described with respect to the right side seat 130, but the description, in the mirror reverse, also applies to the left side seat 134.

Figure 2:
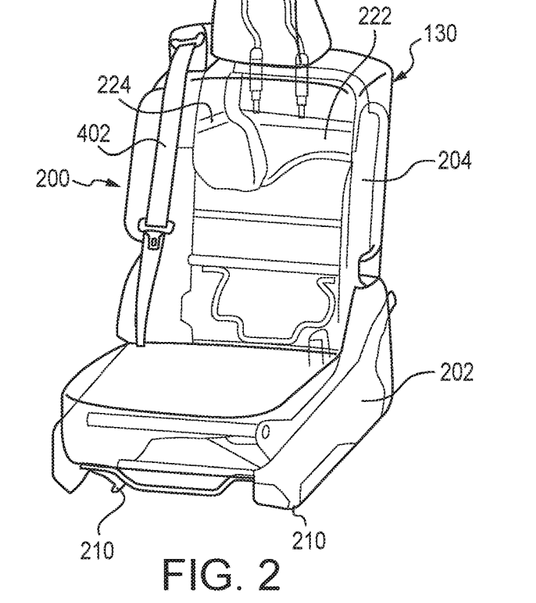
FIG. 2 is a front perspective view of a seat frame with an integrated seat belt system.
Figure 3:
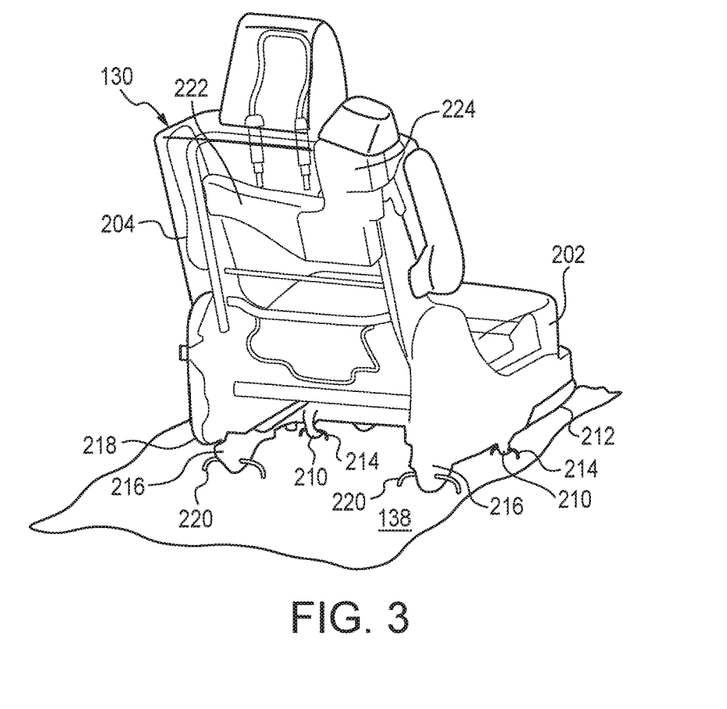
FIG. 3 is a rear perspective view the seat frame of FIG. 2.
Figure 4:
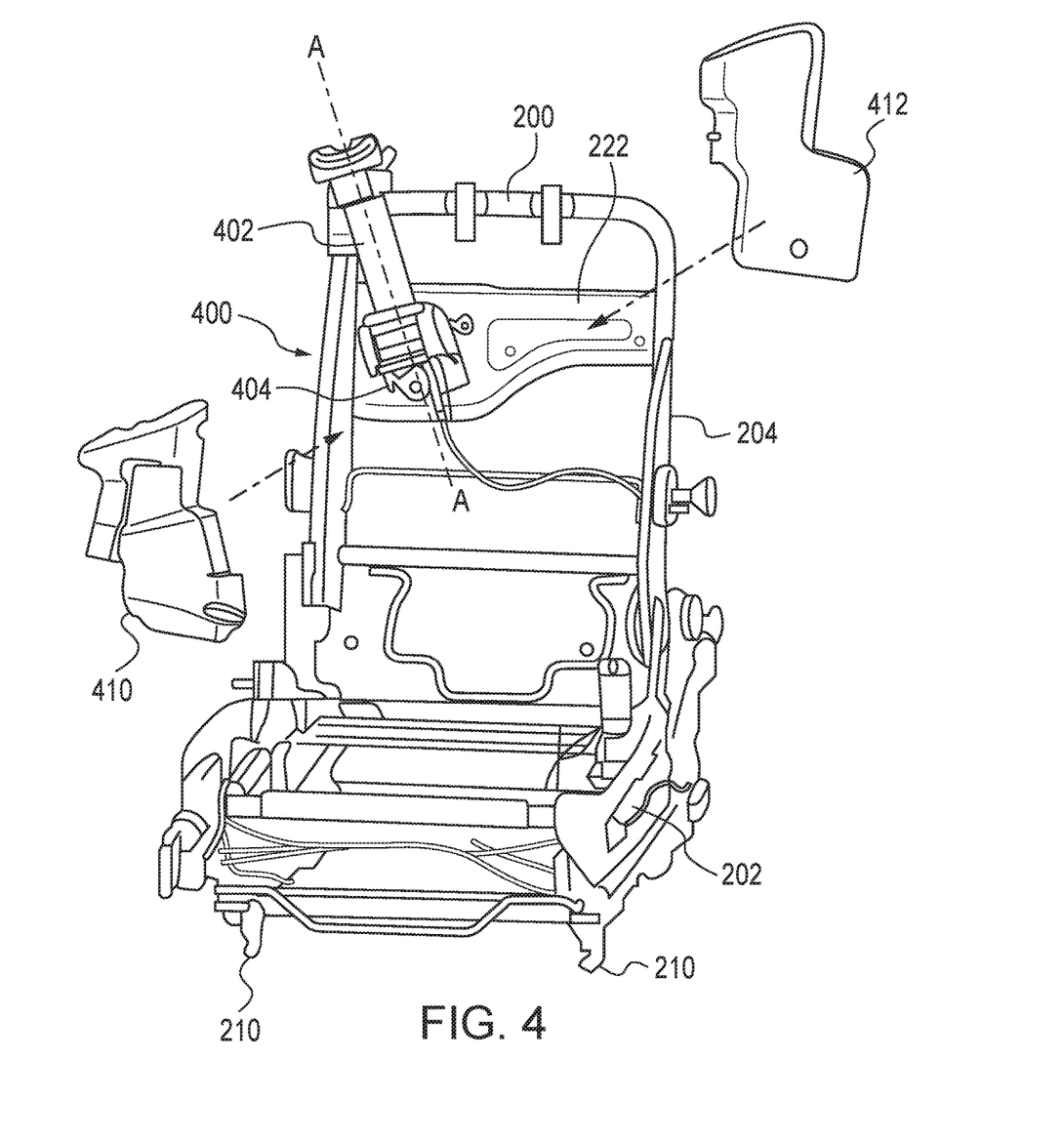
FIG. 4 is an exploded front perspective view of a seat frame with an integrated seat belt system and cover.

FIGS. 2-4 illustrate the frame 200 of one embodiment of a second row seat 130 of a motor vehicle 100. The frame 200 includes a seat base 202 and a seat back 204 extending upwardly from a rear portion 206 of the seat base 202. The bottom 208 of the seat base 202 is attached to the floor 138, as illustrated in FIG. 1, of the interior 102 of the motor vehicle 100. The seat base 202 may be fixedly attached, removably attached, attached to slide rails, or any combination thereof in a matter known to one skilled in the art. The typical seat 130 includes hooks 210 at a forward bottom location 212 of the seat base 202 that contact first loops 214 in the floor 138, and rotatable hook fasteners 216 in a rearward bottom location 218 of the seat base 202 engage second loops 220 in the floor 138. The rotatable hook fasteners 216 rotate to permit the seat 130 to be attached and removed when actuated, but return to a resting position that holds the seat 130 in place when not actuated.

Figure 5:
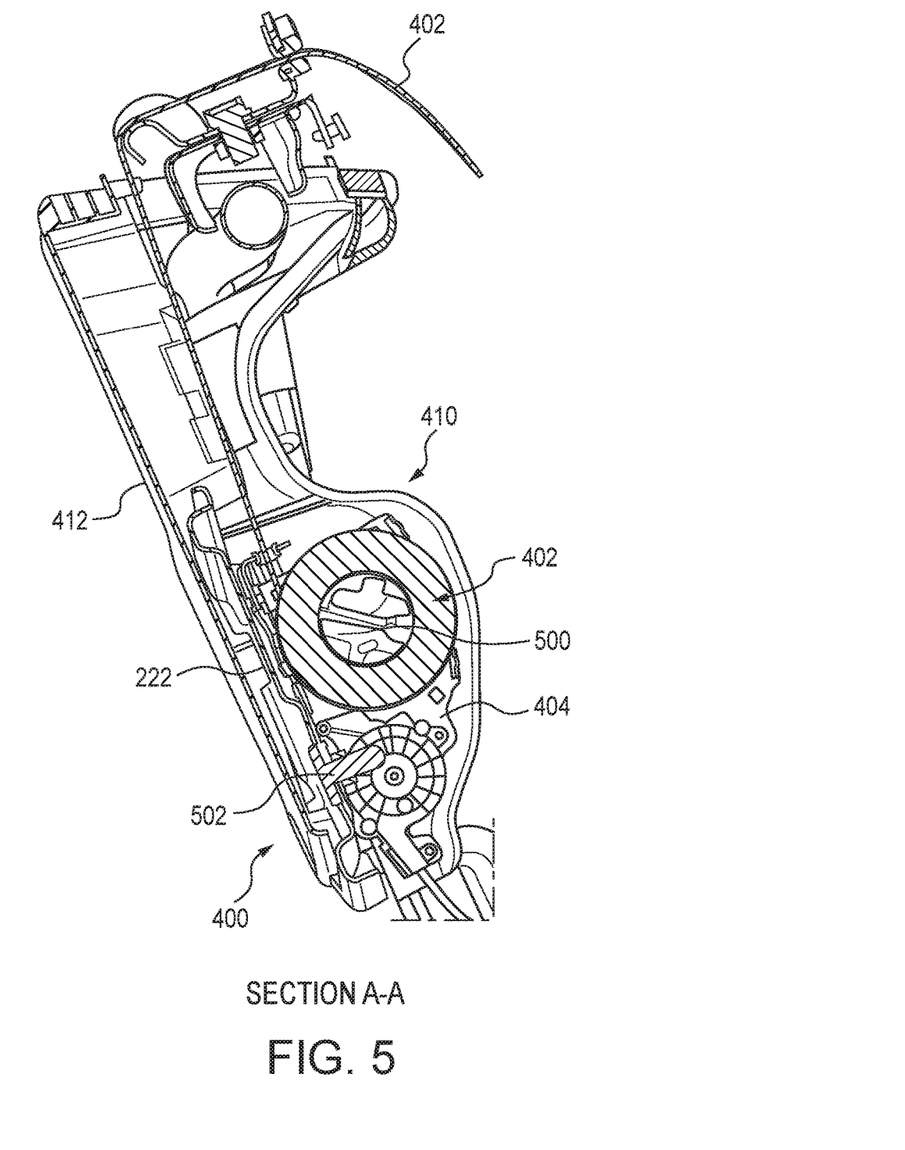
FIG. 5 is a side cross-section view taken along line A-A of FIG. 4.

The seat back 204 may further include a frame cross member 222 upon which a seat belt system 400 is mounted. The seat belt system 400 includes a seat belt 402 that is stored within the seat back 204 in a wound up state and an emergency locking retractor (ELR) 404. The ELR 404 may be mounted to the frame cross member 222 by nuts and bolts, screws, welding, rivets, or any other suitable mounting method. As shown in FIG. 5, the seat belt 402 is stored about a shaft 500 that is biased in a take up direction, and the ELR 404 permits the seat belt 402 to be pulled out and taken up during normal operation of the motor vehicle 100. When a sudden deceleration of the motor vehicle 100 is detected, in a manner known to those skilled in the art, the ELR 404 locks the seat belt 402 in place to prevent the seat belt 402 from being pulled out during a collision event, thereby keeping a passenger in the seat 130 of the motor vehicle 100.

In motor vehicles 100 with fixed seats, the seat belt 402 and ELR 404 are located within a pillar 114, 128 of the motor vehicle 100, where they are protected from damage, debris, and the like. However, the removable nature of the second row 108 of seats requires that the seat belt 402 and ELR 404 be located in the seat back 204 of the seat 130. In the embodiment illustrated, the ELR 404 and the seat belt shaft 500 about which the seat belt 402 is wound are mounted to the frame cross member 222. In order to protect the ELR 404 and the seat belt 402, a cover 224 is positioned over the ELR 404 and the seat belt 402 within the seat 130.

Figure 6:
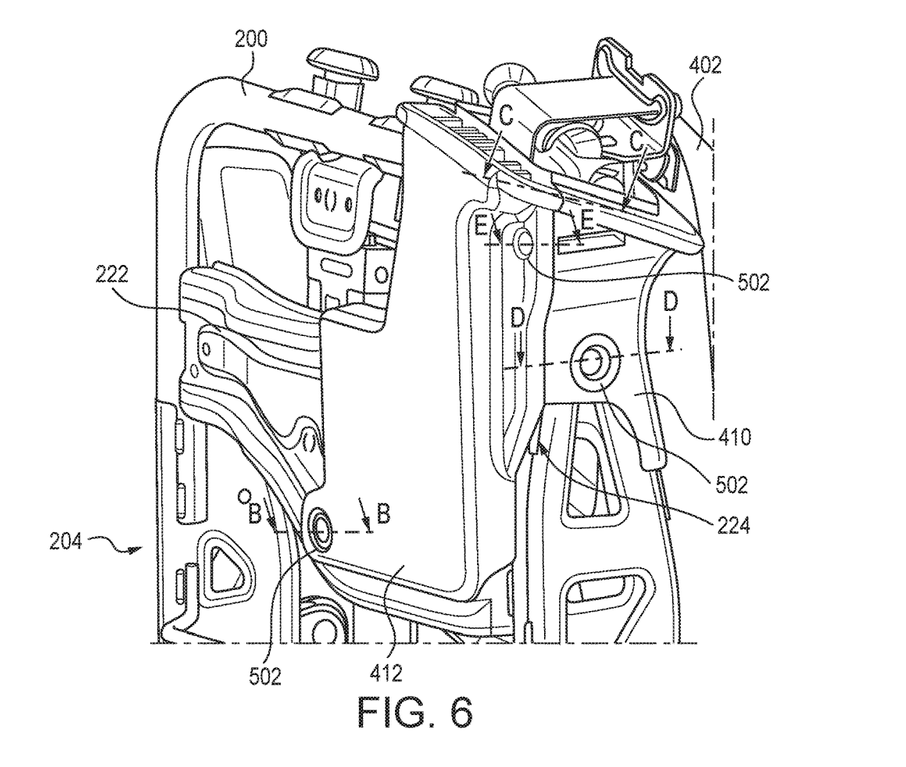
FIG. 6 is a rear perspective view of a cover for an integrated seat belt system.
Figure 7:
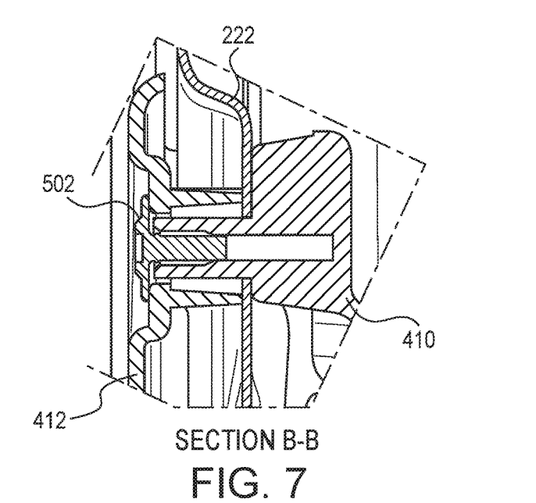
FIG. 7 is a cross-section view taken along line B-B of FIG. 6.

In the embodiment illustrated in FIG. 4, an exploded view of the cover 224 is shown that may include two cover pieces, a front cover piece 410 and rear cover piece 412, that are assembled to cover and protect the seat belt 402 and the ELR 404. As illustrated in FIG. 5, the rear cover piece 412 is secured to the frame cross member 222 by a fastener 502, such as a screw, a nut and bolt, an interference fit fastener, or any other appropriate fastener known to one skilled in the art. The fastener 502 may further attach the front cover piece 410 to the frame cross member and the rear cover piece 412, as illustrated in FIGS. 6-7. FIG. 6 is a rear perspective view of the cover 224. FIG. 7, which is a cross-section along line B-B of FIG. 6, illustrates the fastener 502 connecting the front cover piece 410 and the rear cover piece 412 with the frame cross member 222 interspersed between.

The cover pieces 410, 412 are designed to be at least partially visible to the user of the motor vehicle 100, and as such, may be designed to be styled in any manner that meets the fit and trim level of the interior 102 of the motor vehicle 100. The cover pieces 410, 412 may be constructed and molded out of any suitable plastic used in automotive interior trim pieces, such as polypropylene. Additionally, additional fasteners may be applied to maintain a tight connection between the cover pieces 410, 412 and with the frame 200.

Figure 8:
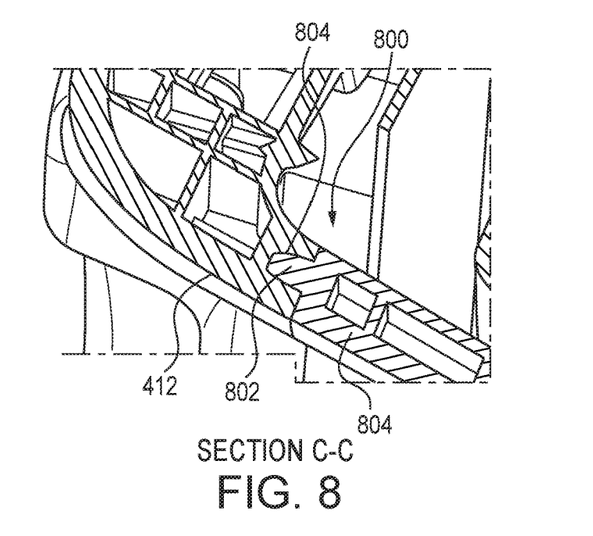
FIG. 8 is a cross-section view taken along line C-C of FIG. 6.

Referring to FIG. 6, additional connections to secure the cover pieces 410, 412 are disclosed. A cross section along line C-C, shown further in FIG. 8, illustrates a pin connection 800. A pin 802 may extend rearwardly from the front cover piece 410 and may be received in a pin hole 804 located in the rear cover piece 412. When assembled, the pin 802 inserted into the pin hole 804 is secured and creates an interference fit between the front cover piece 410 and rear cover piece 412.

Figure 9:
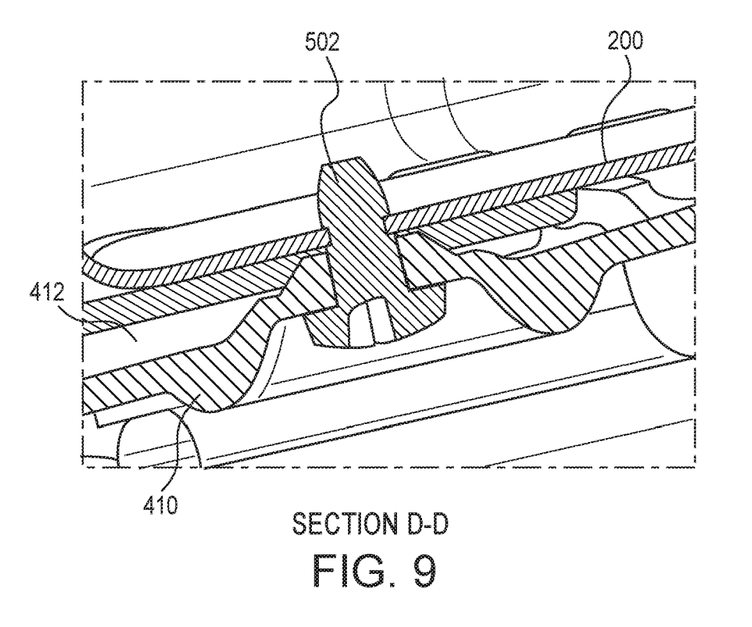
FIG. 9 is a cross-section view taken along line D-D of FIG. 6.

FIG. 9, which is a cross section along line D-D in FIG. 6, illustrates yet another attachment point for the front cover piece 410 to the frame 200. The front cover piece 410 is secured to the frame 200 by a fastener 502, such as a screw, a nut and bolt, an interference fit fastener, or any other appropriate fastener known to one skilled in the art. The fastener 502 may further attach the rear cover piece 412 to the frame 200 and the front cover piece 410, as illustrated in FIG. 9.

Figure 10:
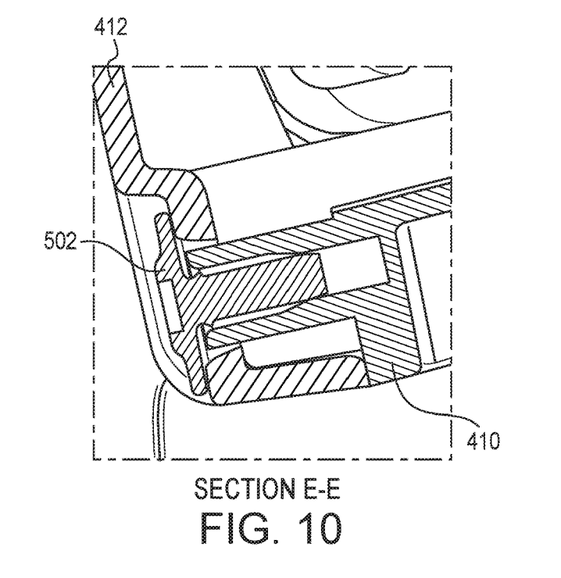
FIG. 10 is a cross-section view taken along line E-E of FIG. 6.

FIG. 10, which is a cross-section along line E-E in FIG. 6, illustrates still yet another connection point between the front cover piece 410 and rear cover piece 412. The rear cover piece 412 is secured to the front cover piece 410 by a fastener 502, such as a screw, a nut and bolt, an interference fit fastener, or any other appropriate fastener known to one skilled in the art.

Figure 11:
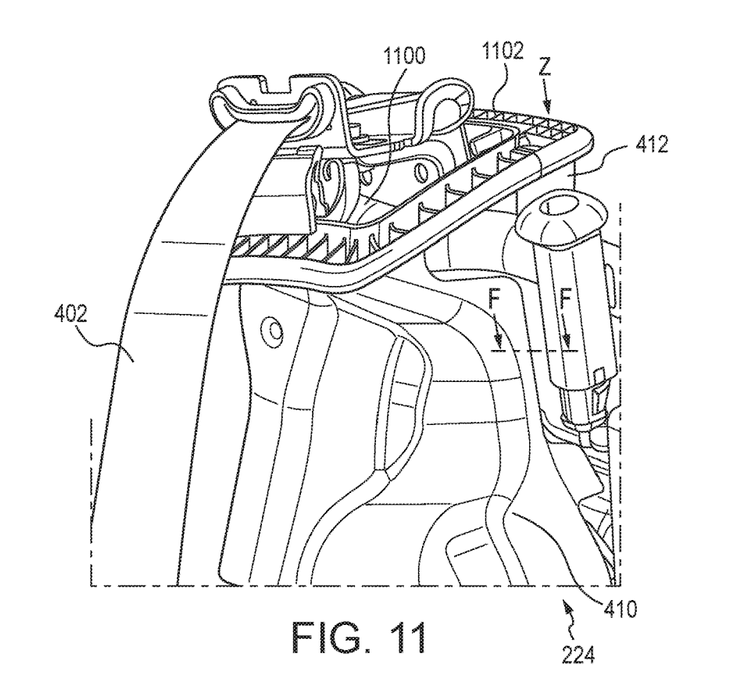
FIG. 11 is a front perspective view of a cover for an integrated seat belt system.
Figure 12:
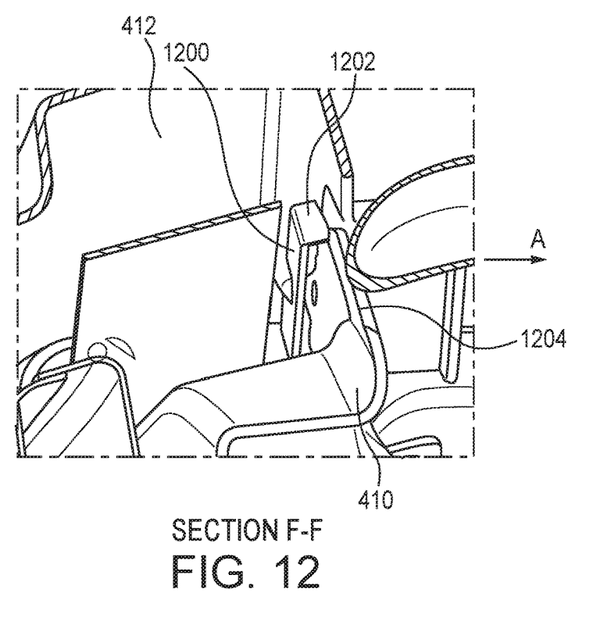
FIG. 12 is a cross-section view taken along line F-F of FIG. 11.

FIG. 11 illustrates the cover 224 from a front perspective view. FIG. 12, which is a cross-section along line F-F of FIG. 11, illustrates a clip 1200 used to attach the front cover piece 410 and rear cover piece 412 together. The clip 1200 may be molded as part of the rear cover piece 412 and biased in the direction represented by arrow A. When the front cover piece 410 is installed, the front cover piece 410 is in connection with the clip 1200. When fully installed, the top 1202 of clip 1200 snaps over the edge 1204 of the front cover piece 410 in the direction of Arrow A, thereby creating an interference fit that prevents the front cover piece 410 and rear cover piece 412 from being separated.

Figure 13:
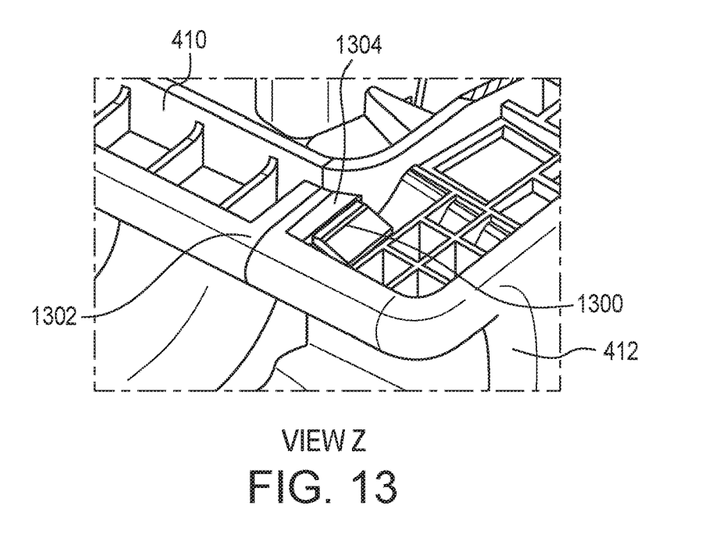
FIG. 13 is perspective view along arrow Z of FIG. 11.

FIG. 13 is view of the top of the cover 224 as viewed from the direction of arrow Z in FIG. 11. A sloped snap clip 1300 may be molded into a leading edge 1302 of the front cover piece 410. When the front cover piece 410 is attached to the rear cover piece 412, the sloped snap clip 1300 is inserted into a slot in the rear cover piece 412, and the sloped snap clip 1300 is biased against a top portion 1304 of the rear cover piece 412, thereby creating an interference fit that prevents the front cover piece 410 and rear cover piece 412 from being separated.

Figure 14:
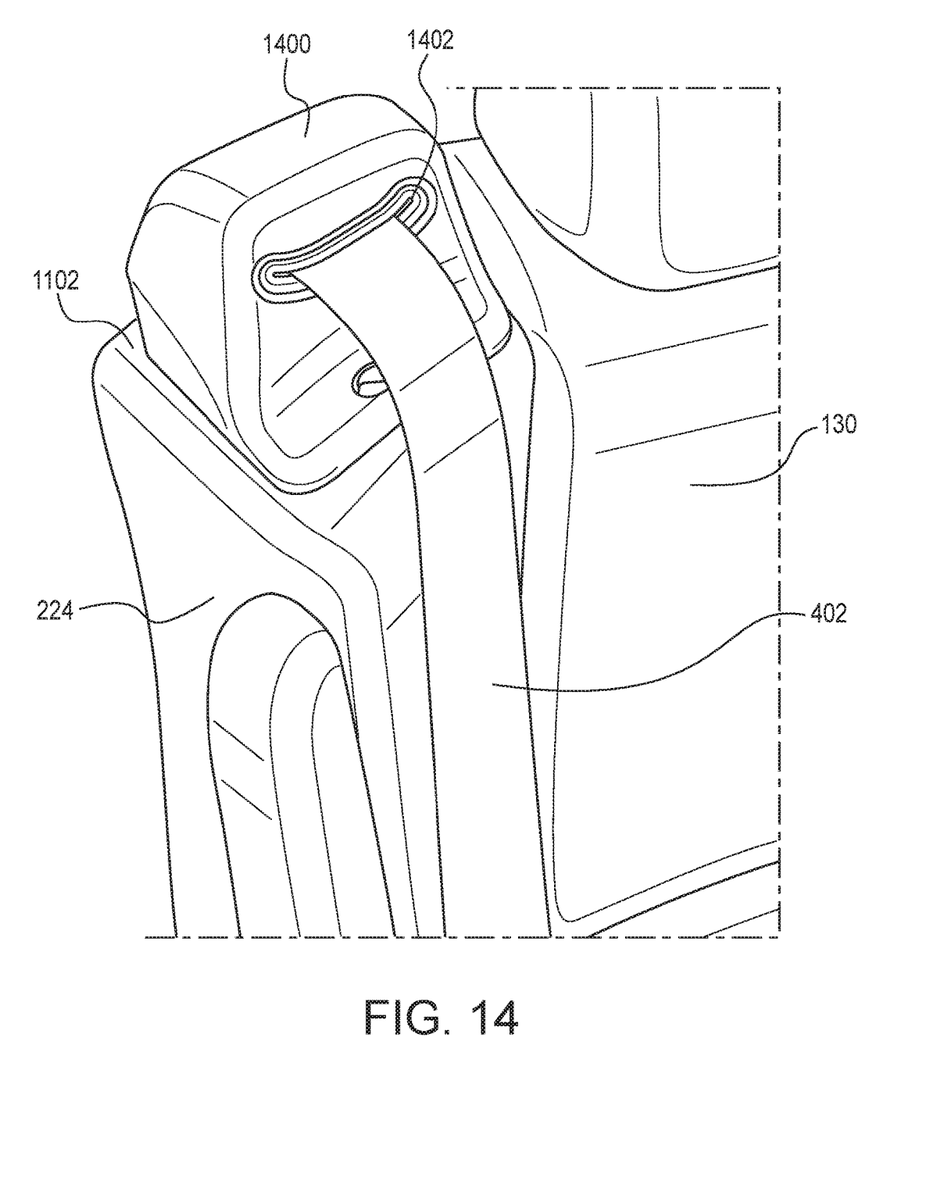
FIG. 14 is a front perspective view of a seat with a cover and a garnish.

As illustrated in FIGS. 11 and 14, the cover 224 may include an opening 1100 in the top 1102 of the cover 224, on top of which is mounted a seat belt garnish 1400. The seat belt 402 runs from the shaft 500 and ELR 404 upwards, as illustrated in FIG. 5, through the opening 1100 into the seat belt garnish 1400. The seat belt 402 exits the seat belt garnish 1400 through an opening 1402 for presentation to the user. The seat belt garnish 1400 is fixed to the seat back 204 by any suitable known fastener known to one skilled in the art, including but not limited to, nuts and bolts, interference fit fasteners, rivets, screws, welding, and the like.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A seat for a motor vehicle, comprising:
   a seat base;
   a seat back extending upwardly from a rear portion of the seat base;
   a seat belt, a portion of the seat belt stored in the seat back;
   an emergency locking retractor in an outboard side of the seat back, the seat belt being threaded through the emergency locking retractor; and
   a cover covering the emergency locking retractor and the portion of the seat belt stored in the seat back, comprising:
      a first cover piece covering a first side of the emergency locking retractor and the portion of the seat belt stored in the seat back; and
      a second cover piece covering a second side of the emergency locking retractor and the portion of the seat belt stored in the seat back wherein a first portion of the second cover piece is styled in a shape of a seat trim and forms a portion of an exterior of the seat back, and a second portion of the second cover piece is covered by the exterior of the seat back.

2. The seat for a motor vehicle of claim 1 wherein the first cover piece is attached to the second cover piece by at least one fastener.

3. The seat for a motor vehicle of claim 2 wherein the cover is plastic.

4. The seat for a motor vehicle of claim 3 wherein the cover is polypropylene.

5. The seat for a motor vehicle of claim 2 further comprising:
   a garnish attached to the seat adjacent an opening in the cover, the seat belt being threaded through the opening and the garnish.

6. A cover for a seat in a motor vehicle, the seat having a seat base, a seat back extending upwardly from a rear portion of the seat base, a seat belt, a portion of the seat belt stored in the seat back, and an emergency locking retractor in an outboard side of the seat back, the seat belt being threaded through the emergency locking retractor, comprising:
   a first cover piece covering a second side of the emergency locking retractor and the portion of the seat belt stored in the seat back wherein a first portion of the first cover piece is styled in a shape of a seat trim and forms a first portion of an exterior of the seat back, and a second portion of the first cover piece is covered by the exterior of the seat back; and
   a second cover piece covering a second side of the emergency locking retractor and the portion of the seat belt stored in the seat back wherein a first portion of the second cover piece is styled in a shape of a seat trim and forms a second portion of the exterior portion of the seat back, and a second portion of the second cover piece is covered by the exterior of the seat back.

7. The cover of claim 6 wherein the first cover piece is attached to the second cover piece by at least one fastener.

8. The cover of claim 7 wherein the first cover piece and the second cover piece are plastic.

9. The cover of claim 8 wherein the first cover piece and the second cover piece are polypropylene.

10. The cover of claim 7 further comprising:
    a garnish attached to the seat adjacent an opening in the cover, the seat belt being threaded through the opening and the garnish.

11. An integrated seat belt system for a seat in a motor vehicle, comprising:
    a seat belt, a portion of the seat belt stored in a seat back of the seat;
    an emergency locking retractor in an outboard side of the seat back, the seat belt being threaded through the emergency locking retractor; and
    a cover covering the emergency locking retractor and the portion of the seat belt stored in the seat back, comprising:
       a first cover piece covering a second side of the emergency locking retractor and the portion of the seat belt stored in the seat back wherein a first portion of the first cover piece is styled in a shape of a seat trim and forms a first portion of an exterior of the seat back, and a second portion of the first cover piece is covered by the exterior of the seat back; and
       a second cover piece covering a second side of the emergency locking retractor and the portion of the seat belt stored in the seat back wherein a first portion of the second cover piece is styled in a shape of a seat trim and forms a second portion of the exterior portion of the seat back, and a second portion of the second cover piece is covered by the exterior of the seat back.

12. The integrated seat belt system of claim 11 wherein the first cover piece is attached to the second cover piece by at least one fastener.

13. The integrated seat belt system of claim 12 wherein the cover is plastic.

14. The integrated seat belt system of claim 11 further comprising:
    a garnish attached to the seat adjacent an opening in the cover, the seat belt being threaded through the opening and the garnish.

15. The integrated seat belt system of claim 14, wherein the seat back includes a forward side and a rearward side, the garnish defines an opening positioned on the forward side, the seat back includes a frame cross member, the emergency locking retractor is secured to a forward side of the frame cross member, the first cover piece is positioned on the forward side of the frame cross member and the second cover piece is positioned on a rearward side of the frame cross member, the emergency locking retractor and at least a portion of the cross member with the emergency locking retractor secured thereto are positioned between the first cover piece and the second cover piece, wherein the first cover piece, the second cover piece, and the garnish define a continuous channel extending from the emergency locking retractor to the opening defined by the garnish, and the seat belt exits the seat back through the opening defined by the garnish on the forward side of the seat back.

\* \* \* \* \*